(12) United States Patent
Goyal et al.

(10) Patent No.: US 12,118,862 B2
(45) Date of Patent: Oct. 15, 2024

(54) SYSTEMS AND METHODS FOR PASSENGER BAGS TAMPERING AND THEFT IDENTIFICATION

(71) Applicant: ARINC Incorporated, Annapolis, MD (US)

(72) Inventors: Nitin Kumar Goyal, Bangalore (IN); Ashutosh Kumar Jha, Bangalore (IN); Vishal Kannan Ram, Bangalore (IN); Venugopal Padmanabhan, Bangalore (IN)

(73) Assignee: ARINC Incorporated, Annapolis, MD (US)

( * ) Notice: Subject to any disclaimer, the term of this patent is extended or adjusted under 35 U.S.C. 154(b) by 10 days.

(21) Appl. No.: 18/122,006

(22) Filed: Mar. 15, 2023

(65) Prior Publication Data

US 2024/0177582 A1 May 30, 2024

(30) Foreign Application Priority Data

Nov. 29, 2022 (IN) .............................. 202211068714

(51) Int. Cl.

| | |
|---|---|
| *G08B 13/196* | (2006.01) |
| *G06V 10/25* | (2022.01) |
| *G06V 10/764* | (2022.01) |
| *G06V 20/40* | (2022.01) |
| *G06V 20/52* | (2022.01) |

(Continued)

(52) U.S. Cl.
CPC ....... *G08B 13/19613* (2013.01); *G06V 10/25* (2022.01); *G06V 10/764* (2022.01); *G06V 20/46* (2022.01); *G06V 20/52* (2022.01); *G06V 20/64* (2022.01); *G06V 40/10* (2022.01); *G08B 13/19669* (2013.01)

(58) Field of Classification Search
CPC ........ G08B 13/19613; G08B 13/19669; G06V 10/25; G06V 20/52; G06V 20/64; G06V 20/46; G06V 40/10; G06V 10/764
See application file for complete search history.

(56) References Cited

U.S. PATENT DOCUMENTS

| | | |
|---|---|---|
| 9,974,371 B2 | 5/2018 | Brandes et al. |
| 11,049,234 B2 | 6/2021 | Maurin et al. |

(Continued)

OTHER PUBLICATIONS

Abubakar Siddique et al. "Tracking Passengers and Baggage Items using Multi-camera Systems at Security Checkpoints", ARXIV.org, Cornell University, Ithaca, NY 14853, Jul. 15, 2020.

(Continued)

*Primary Examiner* — Sunghyoun Park
(74) *Attorney, Agent, or Firm* — Suiter Swantz IP

(57) ABSTRACT

A baggage handling system is described. The baggage handling system may include cameras. Video from the cameras may be automatically monitored. The video may be automatically monitored in real time across the entire journey of the baggage. The baggage handling system may provide an automated approach to identify theft of airport bags\luggage without manual effort required by humans. The bags may then be safely transported through an airport without theft or tampering. The automated surveillance and responding system may not depend on airport staff to monitor for baggage theft. The automated surveillance and responding system may detect multiple types of baggage theft/tampering.

17 Claims, 12 Drawing Sheets

(51) Int. Cl.
  *G06V 20/64*  (2022.01)
  *G06V 40/10*  (2022.01)

(56) References Cited

U.S. PATENT DOCUMENTS

| | | |
|---|---|---|
| 2004/0161133 A1 | 8/2004 | Elazar et al. |
| 2006/0086541 A1 | 4/2006 | Khan et al. |
| 2013/0182890 A1 | 7/2013 | Shehata et al. |
| 2014/0168374 A1 | 6/2014 | Bunkers |
| 2019/0359429 A1 | 11/2019 | Floury et al. |
| 2020/0302589 A1 | 9/2020 | Maurin et al. |
| 2022/0406068 A1* | 12/2022 | Kawase ............... G06Q 50/265 |
| 2023/0040513 A1* | 2/2023 | Ryan .................. G06V 20/52 |

OTHER PUBLICATIONS

Ashraful Islam et al. "Correlating Belongings with Passengers in a Simulated Airport Security Checkpoint", Distributed Smart Cameras, ACM, 2 Penn Plaza, Suite 701,. New York, NY 10121-0701 USA, Sep. 3, 2018, pp. 1-7.
European Search Report dated Feb. 20, 2024; European Application No. 23211241.7.
Ziyan Wu et al. "Real-time airport security checkpoint surveillance using camera network", Computer Vision and Pattern Recognition Workshops (DVPRW), 2011 IEEE Computer Society Conference on, IEEE Jun. 20, 2011, pp. 25-32.

* cited by examiner

202

- 113 VIDEO
- 304 TEMPLATE MATCHING MODEL
  - 324 TEMPLATE IMAGES
  - 326 DETECT CHANGES
    - 328 MARKING
    - 330 ORIENTATION
    - 332 DAMAGE
    - 334 OPENED
- 306 DATABASE
- 308 ENHANCEMENT MODEL

- 302 OBJECT CLASSIFICATION MODEL
  - 310 CLASS(ES)
    - 102 CONVEYOR
    - 108 BAGGAGE
    - 312 HAND
    - 314 HEAD
    - 316 LEG
    - 318 TOOL
  - 320 BOUNDING BOX
  - 322 CONFIDENCE SCORE
- 309 FACIAL RECOGNITION

SYSTEMS AND METHODS FOR PASSENGER BAGS TAMPERING AND THEFT IDENTIFICATION

CROSS-REFERENCE TO RELATED APPLICATIONS

The present application claims the benefit of India Provisional Patent Application 202211068714, filed Nov. 29, 2022, titled "SYSTEMS AND METHODS FOR PASSENGER BAGS TAMPERING AND THEFT IDENTIFICATION", naming Nitin Kumar Goyal et al. as inventors, with a Digital Access Service (DAS) code of E2E4, which is incorporated herein by reference in the entirety.

TECHNICAL FIELD

The present invention generally relates to baggage handling systems, and more specifically to baggage handling systems for routing baggage.

BACKGROUND

Baggage may be tampered with, stolen, or broken into to steal contents of the baggage. Baggage tampering and theft happens in many airports across the globe and is a widely faced issue by airlines and passengers who lose items worth millions of dollars every year. The baggage may be tampered with, stolen, or broken into by any person having access to the baggage. The baggage may travel unaccompanied for long distances on conveyor inside the airport. The conveyor may lead from baggage check-in to an aircraft or form the aircraft to baggage check-out or collection. Surveillance of the conveyor by human personnel is difficult due to the long distances of the conveyor. Thus, the conveyors are one area where thieves may tamper with, steal, or break into the baggage without being surveilled.

The region where the theft\tampering of bag\luggage happens is along the conveyor belt which is in a closed space (like basement, dark isolated areas, etc.) in the airport. Hence, the theft or tampering may go unnoticed. The theft or tempering of the baggage can be done by an airport personnel, contractors, cleaning crew, and the like. The airport personnel be involved in such incidents can be airline staffs, airport staffs and even security people from external agencies. These mentioned people have the access to locations and isolated areas where the conveyor belts run through.

Therefore, it would be advantageous to provide a device, system, and method that cures the shortcomings described above.

SUMMARY

A baggage handling system is described, in accordance with one or more embodiments of the present disclosure. In some embodiments, the baggage handling system includes a first baggage conveyor. In some embodiments, the baggage handling system includes a first camera configured to capture a video. In some embodiments, at least a portion of the first baggage conveyor is disposed in the video. In some embodiments, the baggage handling system includes a display. In some embodiments, the baggage handling system includes a memory maintaining program instructions. In some embodiments, the baggage handling system includes one or more processors configured to execute the program instructions. In some embodiments, the program instructions cause the one or more processors to receive the video. In some embodiments, the program instructions cause the one or more processors to classify the video. The video is classified to determine a first bounding box including the first baggage conveyor. The video is classified to determine a second bounding box including a first baggage. The video is classified to determine a third bounding box including at least one of a body part of a human or a tool. In some embodiments, the program instructions cause the one or more processors to cause the display to display the video, the first bounding box, the second bounding box, and the third bounding box. In some embodiments, the program instructions cause the one or more processors to detect the first baggage is disposed on the first baggage conveyor in a first set of frames of the video by the first bounding box overlapping the second bounding box in the first set of frames. In some embodiments, the program instructions cause the one or more processors to detect the at least one body part of the human or the tool touches the first baggage in the first set of frames by the third bounding box at least partially overlapping the second bounding box in the first of frames.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 3 depicts a block diagram of a memory of a controller, in accordance with one or more embodiments of the present disclosure.

DETAILED DESCRIPTION OF THE INVENTION

Figure 1:
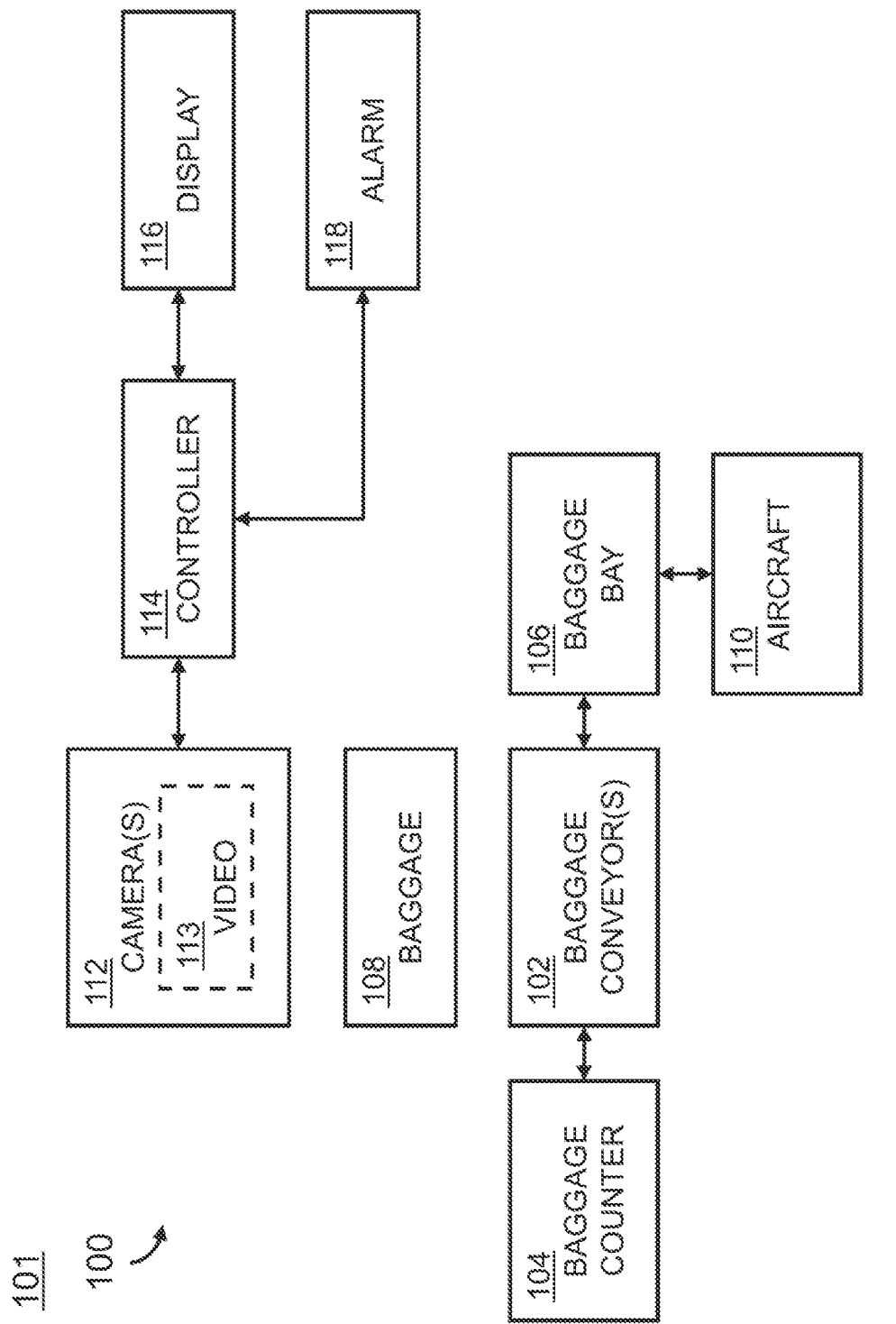
FIG. 1 depicts a block diagram of a baggage handling system, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. Embodiments of the present disclosure are generally directed to a baggage handling system. The baggage handling system may identify one or more events in a video surveillance feed of a baggage conveyor. The baggage handling system may then raise one or more alarms in response to identifying the event. The event may include, but is not limited to, theft, tampering, damaging, or marking of luggage. The event may also include detection of a human or unauthorized personnel. The baggage handling system provides the ability to autonomously detect the events without a need for a human to monitor the video surveillance feed.

FIG. 1 depicts a baggage handling system 100, in accordance with one or more embodiments of the present disclosure. The baggage handling system 100 may include one or more of baggage conveyors 102, a baggage counter 104, a baggage bay 106, baggage 108, aircraft 110, cameras 112, controllers 114, display 116, alarm system 118, and the like. The baggage handling system 100 may be installed in an airport 101. The baggage handling system 100 may transport the baggage 108 between one or more locations in the airport 100, such as between the baggage counter 104 and the baggage bay 106. For example, the baggage counter 104 may be a baggage deposit counter. The baggage conveyor 102 may transport the baggage from the baggage deposit counter to the baggage bay 106 for loading onto one or more baggage carts and subsequently on the aircraft 110. By way of another example, the baggage counter 104 may be a baggage retrieval counter. The baggage conveyor 102 may transport the baggage from the baggage bay 106 to the baggage retrieval counter for retrieval from an owner of the baggage.

The baggage conveyor 102 may include, but is not limited to, a carousel, a belt conveyor, and the like. The baggage conveyor 102 may be horizontal, inclined (e.g., to transport the baggage 108 up or down), and the like. A number of variants of the baggage conveyor 102 are contemplated. The baggage conveyor 102 may also include one or more sorters (not depicted). The sorters may sort the baggage 108 between multiple of the baggage counters 104 and/or baggage bays 106. Thus, the baggage conveyors 102 may provide for handling of the baggage 108 during the transportation process from check-in, scanning, transporting to the aircraft 110, sorting, and loading. Baggage 108 may refer to bags, luggage, carton boxes, wooden boxes, and the like.

In embodiments, the baggage handling system 100 may include one or more cameras 112. The cameras 112 may include any suitable camera known in the art, such as, but not limited to, a charge couple device (CCD) detector, a complementary metal-oxide semiconductor (CMOS), or the like. In embodiments, the cameras 112 may include an auto-focus module. The cameras 112 may be referred to as sensor-camera modules. The cameras 112 may be configured to capture a video 113. The video 113 may refer to a sequence of images. The sequence of images may also be referred to as frames. The video 113 may include a number of frames per second, a resolution, an aspect ratio, and the like based on one or more characteristics of the cameras 112. For example, the number of frames per second may include, but is not limited to, 30 frames per second. By way of another example, the resolution may include, but is not limited to, a 4K resolution. In embodiments, the number of frames per second is predefined or reconfigurable.

The cameras 112 may be installed to monitor the baggage 108 on the baggage conveyors 102. Any number of the cameras 112 may be disposed above the baggage conveyors 102 to capture the video 113 of the baggage conveyors 102. The number of, position of, angle of placement of, and height of the cameras 112 with respect to the baggage conveyors 102 may be selected to achieve a maximum field of view of the baggage conveyors 102 and optimum for quality of the video. In embodiments, at least a portion of the baggage conveyors 102 are disposed in the video. The portion of the baggage conveyors may include a width of the baggage conveyors 102 (e.g., such that an entire width of the belt is in the video 113. The video 113 may or may not include the entire length of the baggage conveyors 102. For example, the length of the baggage conveyors 102 may extend beyond the field of view of the cameras 112. Multiple of the cameras 112 may then be installed to capture the video 113 along the length of the baggage conveyors 102. In embodiments, a free-space is disposed adjacent to a side of the baggage conveyors 102. The free-space may refer to open area in which a human operator may walk. The free-space may be disposed in the video 113. In this regard, the cameras 112 may provide a clear view of a portion of the baggage conveyors 102 including a few feet on either or both sides of the baggage conveyor 102. The camera 112 may then capture any humans next to the baggage conveyor 102. For example, the cameras 112 may capture 3 feet each on both sides of the baggage conveyor when the camera is fixed at a height of 10 feet above the conveyor belt, although this is not intended to be limiting.

The cameras 112 may be communicatively coupled to the controllers 114. The cameras 112 may include one or more network interfaces, hardware interfaces, and/or communication interfaces for communicating with the controller 114. In some embodiments, the interface is a USB digital connection or an ethernet connection, although this is not intended to be limiting. The cameras 112 may provide the video 113 to the controllers 114 by the interface. The cameras 112 may also receive one or more commands from the controllers by the interface. For example, the cameras 112 may receive feedback to zoom, adjust a brightness, adjust a contrast, and the like.

In embodiments, the baggage handling system 100 may include one or more controllers 114. The controllers 114 may receive the video 113. The video 113 may be a live video feed. The controllers 114 may perform analytics on the video 113 to detect objects, collect object related data, and stores the objects and the object related data in memory, as will be described further herein. The following are the scenarios the controller 114 may detect in the video 113: detect a suspicious person entering the region of conveyor belt, detect if the person detected is an airport personnel or a stranger, detect baggage for any movement when traversing on the conveyor belt, detect if the baggage is damaged or tampered, detect if any human is touching the baggage on the conveyor belt, detect if the baggage is moved out of the conveyor belt, detect markings on the baggage, detect any tools\weapons which might be used for baggage tampering. The controller 114 continuously checks that baggage 108 is not moved from the baggage conveyor 102. If any baggage 108 is moved from the baggage conveyor 102, a person comes and pushes\pulls the baggage from the baggage conveyor 102, or a person stands in a space next to a side of the of the baggage conveyor 102, the controller 114 may sends alert signals to the displays 116 and/or alarm system 118. The alert signals may be sent in automated way without manual checks by any human.

In embodiments, the baggage handling system 100 may include one or more displays 116 and/or an alarm system 118. The controller 114 may cause the display 116 to display the video feed from the cameras 112. The video feed may be displayed on the display 116 by one or more graphical user interfaces (GUI). In some embodiments, the controller 114 may cause the display 116 to display one or more objects detected in the video feed. For example, the controller 114 may cause the display to display the video 113 and one or more bounding boxes including the objects detected in the video. In some embodiments, the controller 114 may cause the display 116 to display a screenshot from the video feed. In some embodiments, the controller 114 may cause the display 116 to display one or more alerts. The alerts may indicate an incident has been detected, such as, but not limited to, detection of a stranger who is adjacent to the baggage conveyor 102, movement\tampering\damaging of the baggage 108, a human touching the baggage 108, and the like.

In some embodiments, the display 116 may display video feeds from multiple of the cameras 112 simultaneously. The display 116 may include multiple viewing options, such as viewing video 113 from one of the cameras 112 or viewing video 113 from multiple of the cameras 112 at a time (e.g., in a split-screen display). The display 116 may include an option to select video 113 of one or more of the cameras 112 from a Graphical User Interface (GUI). The GUI may also include an option to select previously recorded videos to be played based on date\time. For example, the recorded videos may be created with folder names saved as with a date and time. The snapshot of the incidents may be stored in a separate folder from which the date and time of the incident may be retrieved. Airport personnel or security may then view the recorded videos of the live feed or stored incidents.

The display 116 may include may include any display device known in the art. For example, the display device may include, but is not limited to, a liquid crystal display (LCD), a light-emitting diode (LED) based display, an organic light-emitting diode (OLED) based display, an electroluminescent display (ELD), a plasma display panel (PDP), a display light processing (DLP) display, or the like. In some embodiments, the display 116 may include a handheld mobile phone, or the like. Those skilled in the art should recognize that a variety of display devices may be suitable for implementation in the present invention and the particular choice of display device may depend on a variety of factors.

In embodiments, the controller 114 may also activate the alarm system 118. The alarm system 118 may include, but is not limited to, a light-based alarm system, an audio-based alarm system, and the like. The alarm system 118 may be activated to alarm one or more security personnel of an incident regarding the baggage conveyor 102. Activating the alarm system 118 may refer to causing a light to be displayed or flashed, causing an audio alarm to be generated, and the like.

In some embodiments, the cameras 112, the controller 114, the display 116, and/or the alarm 118 may be collectively be referred to as a display and alarm system, an automated surveillance and response system, a video-based analytics system, a distributed security and analytics systems, and the like.

Figure 2:
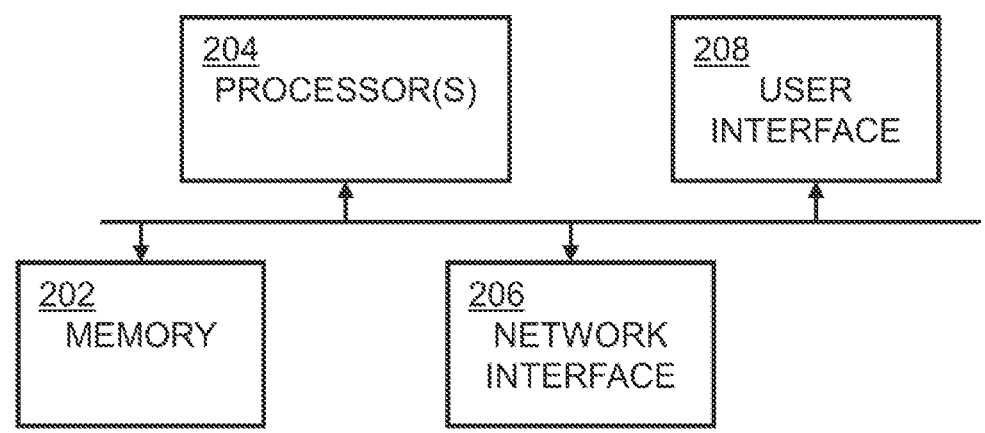
FIG. 2 depicts a block diagram of a controller of a baggage handling system, in accordance with one or more embodiments of the present disclosure.

Referring now to FIG. 2, the controller 114 is described, in accordance with one or more embodiments of the present disclosure. In embodiments, the controller 114 may include one or more of a memory 202, processors 204, network interface 206, user interface 208, and the like.

The memory 202 may include any storage medium known in the art. For example, the storage medium may include a non-transitory memory medium. For instance, the non-transitory memory medium may include, but is not limited to, a read-only memory (ROM), a random-access memory (RAM), a magnetic or optical memory device (e.g., disk), a solid-state drive and the like. It is further noted that memory may be housed in a common controller housing with the one or more processor(s). For example, the memory and the processor may be housed in a processing unit, control display unit, or the like. In an alternative embodiment, the memory may be located remotely with respect to the physical location of the processor. In another embodiment, the memory maintains program instructions for causing the processor(s) to carry out the various steps described through the present disclosure.

The processors 204 may include any processing unit known in the art. For example, the processor may include a multi-core processor, a single-core processor, a reconfigurable logic device (e.g., FPGAs), a digital signal processor (DSP), a special purpose logic device (e.g., ASICs)), a graphics processing unit (GPU), a deep processing unit (DPU), a combination thereof, or other integrated formats. Those skilled in the art will recognize that aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure. Such hardware, software, and/or firmware implementation may be a design choice based on various cost, efficiency, or other metrics. In this sense, the processor(s) may include any microprocessor-type device configured to execute software algorithms and/or instructions. In general, the term "processor" may be broadly defined to encompass any device having one or more processing elements, which execute program instructions from memory, from firmware, or by hardware implemented functions. It should be recognized that the steps described throughout the present disclosure may be carried out by the processors.

The network interface 206 may include any suitable network interface for interfacing with the cameras 112, the display 116, and/or the alarm 118, such as, but not limited to, a wired or a wireless network interface. The network interface may include mechanical, electrical, or signaling circuitry for communicating data to and from the cameras 112, the display 116, and/or the alarm 118. The controller 114 may be configured to receive various input signals and transmit various output signals from the network interface. For example, the processor 204 may receive the video 113 by way of the network interface 206. By way of another example, the processor 204 may transmit the video and one or more bounding boxes to the display 116 by way of the network interface 206 causing the display 116 to display the video and the bounding boxes.

The user interface 208 may include, but is not limited to, one or more desktops, laptops, tablets, and the like. In embodiments, the user interface includes a display used to display data to a user. The display of the user interface may include any display known in the art. For example, the display may include, but is not limited to, a liquid crystal display (LCD), an organic light-emitting diode (OLED) based display, or a CRT display. Those skilled in the art should recognize that any display device capable of integration with a user interface is suitable for implementation in the present disclosure. In embodiments, a user may input selections and/or instructions responsive to data displayed to the user via a user input device of the user interface. The controller 114 may be configured to receive an input from a user by the user interface. Thus, the user interface may allow the user to interact with the user interface, including through the execution of stored procedures.

Referring now to FIG. 3, the memory 202 is described, in accordance with one or more embodiments of the present disclosure. In embodiments, the memory 202 may include one or more program instructions. In embodiments, the memory 202 may include one or more of the video 113, an object classification model 302, an template matching model 304, a database 306, a low-light enhancement model 308, a facial recognition model 309, and the like.

The object classification model 302 is configured to classify one or more classes 310 of objects in the video 113. The classes 310 represent the different kinds of objects the system can detect. The processors 204 may use the model 302 to classify each of the classes 310 of objects in the video 113. For example, the model 302 may be configured to classify one or more of the baggage conveyor 102, the baggage 108, a human, a tool 318, and the like. In some embodiments, the model 302 may be configured to classify a body part of the human, such as, but not limited to, a hand 312, a head 314, a leg 316 (e.g., a foot or a shoe), and the like. As may be understood, the model 302 may classify any body part of the human, such as, but not limited to, arms, hands, fingers, gloves, heads, upper legs, lower legs, feet, shoes, torso, and the like. The hand 312 and the leg 316 may be particularly advantageous, as these appendages may be used to interact with the baggage 108. The object classification model 302 may also be configured to classify the tool 318. The tool 318 may generally include any tool held in one or two hands. The tool 318 may be used by the human for the purposes of pushing or pulling the baggage 108 from the baggage conveyor 102. For example, the tool 318 may include, but is not limited to, rope, stick, thread, and the like. In this regard, the classes 310 may include any of the conveyor 102, the baggage 108, a body part of a human (e.g., the hand 312, the head 314, the leg 316, etc.) and/or the tool 318.

The object classification model 302 is configured to classify the video 113 to determine one or more bounding boxes 320. The bounding box 320 represents that the model thinks that the object is in the image or frame at the location within the bounding box. The bounding boxes 320 may include any of the various classes 310, such as, but not limited to, conveyor 102, the baggage 108, the hand 312, the head 314, the leg 316, and/or the tool 318. The bounding boxes 320 may indicate the location of one or more of the classes 310 of objects in the frames or images of the video 113. Each of the bounding boxes 320 may bound a rectangular subset of pixels in each image of the video 113. The bounding box 320 may represent the location of the object in the images of the video based the rectangular subset of pixels. The bounding boxes 320 may also be labelled with the class which is detected in the image.

The object classification model 302 is configured to generate a confidence score 322. Each of the bounding boxes 320 may be generated with the confidence score 322. The confidence score may indicate the confidence level of the object classification model 302 that the object is in the bounding box 320. The confidence score 322 may be a numerical value between 0 and 100, with 100 indicating full confidence. In some instances, the confidence score 322 may be displayed above the bounding box 320 on the video 113.

The video 113 may include a sequence of images. The processors 204 may determine the bounding boxes 320 and confidence score 322 for each of the objects in the images (e.g., by the object classification model 302). In some embodiments, the processors 204 may determine the bounding boxes 320 and confidence score 322 for each of the objects in each of the images. In some embodiments, the processors 204 may determine the bounding boxes 320 and confidence score 322 for each of the objects in a subset of the images. Determining the bounding boxes for the subset of the images may be advantageous to reduce the processing requirement. For example, the video 113 may be captured with a frame rate of 24 frames per second (FPS) to 30 FPS or more. The video 113 may also be captured with a frame rate below 24 PFS, such as 20 FPS or below. The object classification model 302 may be performed on a subset of the frames, such as, but not limited to 10 FPS to 12 FPS of the frames. As may be understood, the specific subset is not intended to be limiting. The number of FPS on which the object classification model 302 is performed may be configurable.

In embodiments, the processors 204 are configured to detect and track the number of baggage 108 on the conveyor using the object classification model 302. Similarly, the processors 204 may detect and track the number of hands 312, heads 314, legs 316, tools 318, and the like are in every frame of the video 113.

In embodiments, the memory 202 may include a template matching model 304. The template matching model 304 may include one or more template images 324. The template images 324 may be captured from the video 113. In some embodiments, the template images 324 may include a template image of each of the baggage 108 on the baggage conveyors 102. The template image of each of the baggage 108 on the baggage conveyors 102 may be captured by one or more of the cameras 112. Each of the baggage 108 may then be assigned a unique identifier associated with the template images 324. The baggage 108 may then be identified by comparing the video 113 with template images 324. The template matching model 304 may extract one or more features from the images in the video 113 and the template images 324. The template matching model 304 may then compare the features to detect whether the images in the video match the template images 324. In this regard, the processors 204 may be configured to detect whether the baggage 108 is detected in subsequent frames of the video 113 by the template matching model 304.

In some embodiments, the template matching model 304 automatically generates the template images 324 of the baggage 108. For example, the object classification model 302 may classify the video 113 to detect a bounding box 320 including the baggage 108. The template matching model 304 may receive the bounding box 320 and use the portion of the image within the bounding box 320 including the baggage 108 as the template image 324.

In embodiments, the template matching model 304 is configured to cause the processors 204 to detect changes 326 in the baggage 108. The template matching model 304 may also identify a condition of the baggage 108 for potential tampering and any unique markings on the baggage 108. The changes 326 may be detected by the template matching model 304 comparing the video 113 with the template images 324. The change 326 in the baggage 108 may then be detected and reported. An alarm may be raised if any baggage 108 is opened or tampered or unique marking is present. The template matching model 304 may thus cause the processors 204 to detect a scenario of theft and theft related activities such as damaging or tampering with the baggage 108. The change 326 may include, but is not limited to, a marking 328 on the baggage 108, an orientation 330 of the baggage 108, damage 332 to the baggage 108, and/or whether the baggage 108 is opened 334. Any of the marking 328, the orientation 330, the damage 332, and/or the baggage being opened 334 may indicate the baggage 108 has been tampered with.

In embodiments, the template matching model 304 is configured to cause the processors 204 to check for the baggage. Checking for the baggage may include detecting whether the template image 324 is or is not found to match with any of the detected baggage in the video 113. If the template image 324 is not found to match for an amount of time, then alarm may be raised. The amount of time may be configurable. In some embodiments, the amount of time may be the time taken by for the baggage 108 to traverse the portion of the baggage conveyor 102 which is in the video 113, although this is not intended to be limiting. In this regard, the template matching model 304 may cause the processors 204 to detect whether the baggage 108 is missing from the video 113.

In embodiments, the template matching model 304 may assign the baggage 108 a unique identifier. The identifier may then be maintained as the baggage 108 travels along the baggage conveyor 102. The identifier may be maintained even where the baggage 108 goes through multiple zones of the cameras. A final camera may check if template image matches the baggage to make sure that the baggage which entered the baggage conveyor has also exited the baggage conveyor. In this regard, the baggage entering the belt region in the first camera is captured as a snapshot and the same snapshot is compared and verified if it is present in the last camera. Both the snapshots are compared to see how close they are same with respect to angle and orientation of the luggage, if they are opened or closed. Each baggage entering the first camera's frame is assigned a unique number and the system ensures that the same baggage with that unique number is seen in the last frame of the last camera placed in the conveyor belt region. Also, since each baggage has a unique number assigned, the system checks for the baggage sequence in consecutive cameras. For example, if in the first camera a baggage is identified with number 1 and a second baggage is identified as 2, then the same sequence of the numbers is checked in every camera from the second camera till the last camera of the belt region. If the sequence with respect to the assigned number is changed, then an alarm is raised.

In embodiments, the template matching model 304 may be used to detect delays in the movement of the baggage 108 along the baggage conveyor 102. If a particular baggage takes more than a particular time to traverse from the start of the conveyor belt to the end, then an alarm is raised to notify there is an unusual delay. The particular time may be configurable per airport conveyor belt length and speed of belt movement. The delay may also be because of any unauthorized stop of the belt or movement of baggage. This process ensures that all baggage from entrance to exit are safely transported.

In embodiments, the memory 202 may include a database 306. The database 306 may provide storage of the videos 113 captured by the cameras 112 to an on-board database. The database 306 may also store any incidents and suspicious scenarios detect in the video 113. For example, the database 306 may store the bounding boxes 320, the confidence score 322, the template images 324, the changes 326, and the like. The database 306 may then be used to view the incidents at a later time. The frames may be labelled with the bounding boxes 320, the confidence score 322, and the like to help replay the captured incidents. Security personnel may then view the frames to respond to situations, review footage, and uncover trends so that they can utilize video footage more effectively. The recordings may be timestamped and maintained with cumulative data of details of baggage on the baggage conveyor. In embodiments, the database 306 includes a snapshot of the incidents. The snapshot may be one of the frames of the video 113. The snapshot may include the time and date of the event. The database 306 may include cumulative data for each camera 112. The cumulative data may include a number of bags detected, a number of hands detected, a number of heads detected, a number of legs detected, a number of bags moved out of the belt, and the like.

In embodiments, the memory 202 may include an enhancement model 308. The enhancement model 308 may also be referred to as a low-light enhancement model. The baggage conveyor 102 may be in a dark region of the airport 100. The enhancement model 308 may detect the luminance of the video 113 and pre-process the frames captured by the camera 112. The frames may be pre-processed to improve the object classification model 302 and/or the template matching model 304. The program instructions may cause the processors 204 to preprocess the video 113 to increase a luminance of the video. The luminance of the video 113 may be as low as one lux. In embodiments, the processors 204 are configured to detect the classes 310 of the objects in low lighting conditions (e.g., one lux) by increasing the luminance using the enhancement model 308. The enhancement model 308 may also pre-process the video 113 to reduce glaring conditions by the lens of the camera 112.

In embodiments, the memory 202 may include a facial recognition model 309. The facial recognition model 309 may detect whether the head 314 of the human is authorized. Once human is detected, the facial recognition model 309 may cause the processors 204 to check if the human is an airport personnel (Security persons, Maintenance person, Airline staff, Airport staff and Contractors) or an unauthorized stranger. The facial recognition model 309 may compare the face with a database including airport crew and personnel details. The processors 204 may then cause the display 116 to display whether the human is authorized or unauthorized. The ability to performs analytics on authorized vs unauthorized personnel and raising on alarm based on the identification may help improve the security within the airport 100.

Figure 4A:
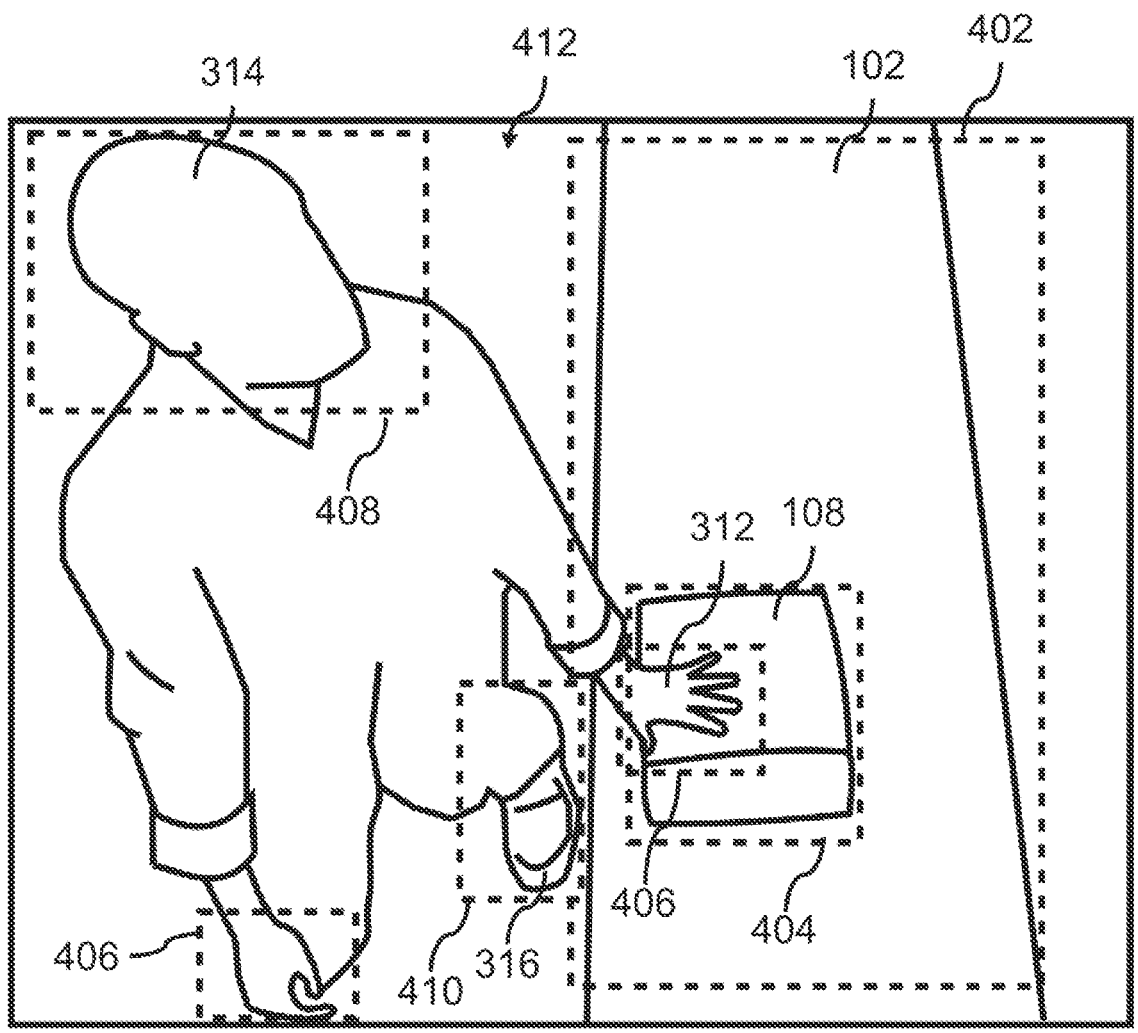
FIGS. 4A-4B depicts an image from a camera of a baggage handling system including bounding boxes, in accordance with one or more embodiments of the present disclosure.
Figure 4B:
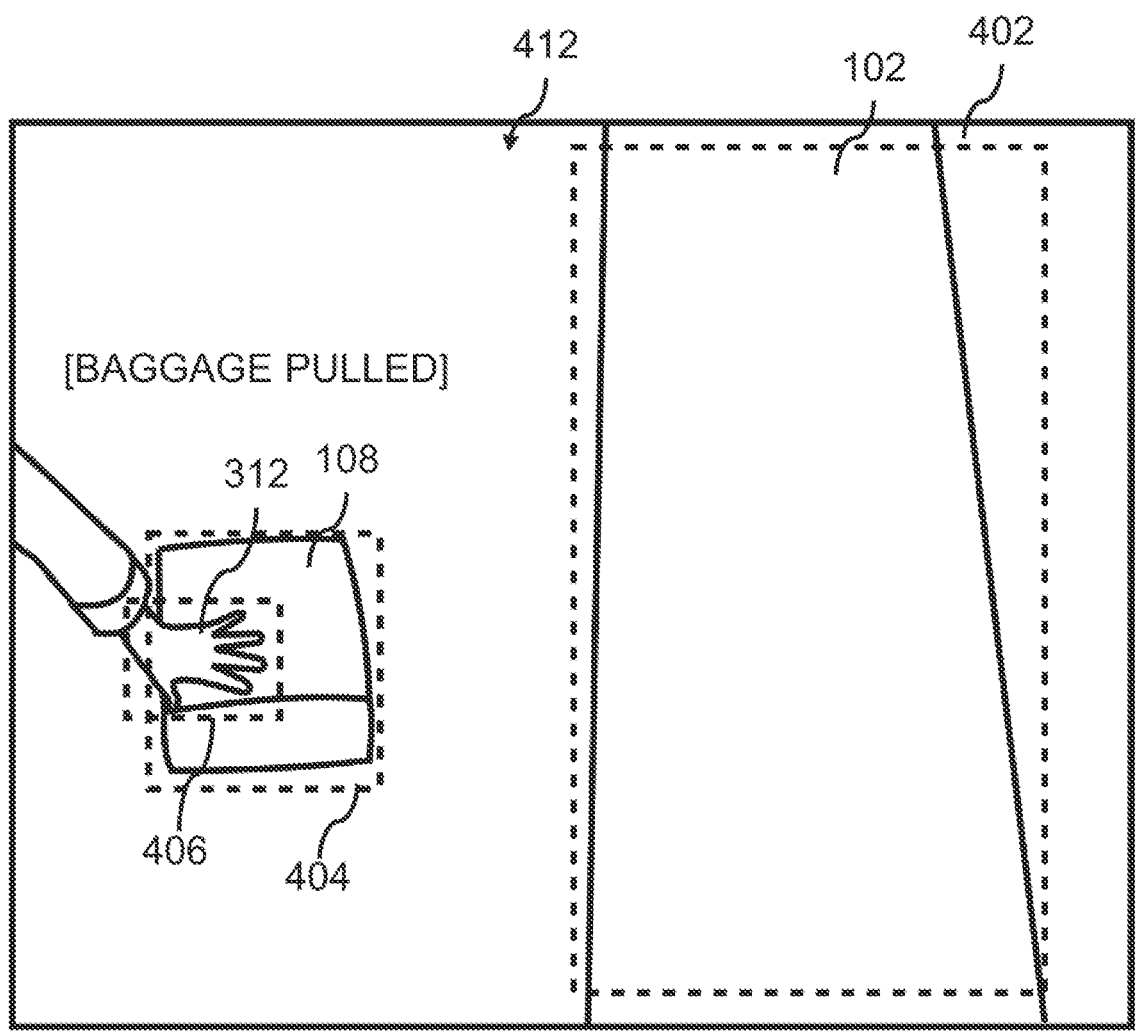

Referring generally to FIGS. 4A-4B, images 400 are depicted, in accordance with one or more embodiments of the present disclosure. The images 400 may also be referred to as frames of the video. The processors 204 may use the object classification model 302 to classify the video 113 to detect the bounding boxes 320, confidence scores 322, and the like. The processors 204 may receive the classification of the bounding boxes from the object classification model 302. In embodiments, the processors 204 are configured to detect the bounding box 320 overlaps with or at least partially overlaps another bounding box by comparing the dimensions and placement of the bounding boxes 320 (e.g., as determined by the object classification model 302). Overlapping may refer to one bounding box extending over or covering another bounding box. At least partially overlapping may refer to a portion of one bounding box overlapping with a portion of another bounding box. The ability to detect the overlap or the at least partial overlap may be advantageous for detecting one or more events in the video 113, as will be described further herein.

Referring now to FIG. 4A, an image 400a is described, in accordance with one or more embodiments of the present disclosure. The image 400a may be one or more images in a first set of frames of the video 113. In embodiments, the processors 204 are configured to classify the video to determine a bounding box 402 including the baggage conveyor 102, a bounding box 404 including the baggage 108, bounding box 406 including the hand 312, a bounding box 408 including the head 314, a bonding box 410 including the leg 316, and the like.

In embodiments, the processors 204 are configured to detect the bounding box 404 overlaps the bounding box 402. The overlap between the bounding box 404 and the bounding box 402 indicates the baggage 108 is disposed on the baggage conveyor 102 in the set of frames. Thus, the processors 204 are configured to detect the baggage 108 is disposed on the baggage conveyor 102 in the set of frames by the bounding box 402 overlapping with the bounding box 404 in the set of frames.

In embodiments, the processors 204 are configured to detect the bounding box 404 overlaps with one or more of the bounding box 406, the bounding box 408, and/or the bounding box 410. The partial overlap between the bounding box 404 and the bounding box 406 may indicate at least a portion of the hand 312 is touching the baggage 108. Similarly, the partial overlap between the bounding box 404 one of the bounding box 410 may indicate at least a portion of the leg 316 is touching the baggage 108. Commonly, detecting the hand 312 touching the baggage 108 is desirable, however, the human may use another body part (e.g., the leg 316) to touch the baggage 108. The ability to detect the either the hand 312, the leg 316, or another body part is thus desirable. The processors 204 are configured to automatically detect when a body part of the human touches the baggage 108 while the baggage is on the baggage conveyor 102. For example, the body part of the human may touch the baggage 108 for several frames in the video 113. Although not depicted, the processors 204 may also classify a bounding box for the tool 318 and detect when the bounding box of the tool 318 at least partially overlaps with the bounding box 404 of the baggage 108. The partial overlap of the bounding box including tool 318 with the bounding box 404 including the baggage 108 may indicate that the tool touches the baggage in the set of frames. Thus, the processors 204 are configured to detect at least one body part of the human or the tool touches the baggage in the set of frames by the various bounding boxes (e.g., bounding box 406, bounding box 408, bounding box 410) at least partially overlapping with the bounding box 404 in the set of frames.

The program instructions may cause the processors 204 to trigger an alarm and/or record the video 113 in the memory 202 in response to detecting that the bounding box of the body part of the human and/or the tool at least partially overlaps with the baggage (e.g., the human and/or tool touches the baggage). In some instances, minute movement of the baggage 108 by the human or the tool will not be captured as incident. In this regard, personnel may move the baggage 108 to place them properly on the baggage conveyor 102. In embodiments, the processors 204 may trigger an alarm and/or store the frames if the body part of the human and/or the tool touches the baggage for more than a duration (i.e., based on the duration of overlap of the bounding boxes). The duration may include, but is not limited to five seconds. For example, the program instructions may cause the processors 204 to record the video 113 in the memory 202 in response to detecting that the bounding box 406 or the bounding box 410 at least partially overlaps the bounding box 404 for at least five seconds. The processors 204 may also raise an alarm.

The image 400a may also include a free-space 412 which is disposed in the video. The free-space 412 may be disposed adjacent to a side of at least a portion of the baggage conveyor 102. In embodiments, the processors 204 are configured to detect that at least one of the bounding box 406, the bounding box 408, or the bounding box 410 is disposed in the free-space 412. The bounding box 406, the bounding box 408, or the bounding box 410 being disposed in the free-space 412 may indicate a human is walking next to the baggage conveyor 102. In the example depicted in FIG. 4A, the human includes one or more body parts (e.g., a hand, a foot, and a head) which are detected in the free-space 412.

Referring now to FIG. 4B, an image 400b is described, in accordance with one or more embodiments of the present disclosure. The image 400b may be one or more images in a second set of frames of the video 113. The processors 204 may be configured to detect the bounding box 404 is disposed adjacent to the bounding box 402 in the video 113. The bounding box 404 being disposed adjacent to the bounding box 402 may indicate the baggage 108 is disposed in the free-space 412 which is adjacent to the baggage conveyor 102 in the second set of frames. The baggage 108 has thus been pulled or pushed from the baggage conveyor 102 prematurely, indicating a potential theft of the baggage. Thus, the processors 204 are configured to detect the baggage is disposed in the free space 412 in the set of frames by the bounding box 404 being disposed adjacent to the bounding box 402 in the set of frames. In this regard the processors 204 may automatically detect when the baggage 108 exits in the middle of the conveyor into an unauthorized zone. The program instructions may cause the processors 204 to record the video 113 in the memory 202 in response to detecting that the bounding box 404 is disposed adjacent to the bounding box 402. The processors 204 may also raise an alarm.

In embodiments, the processors 204 may be configured to detect the at least one of the bounding box 406, the bounding box 408, or the bounding box 410 is disposed adjacent to the bounding box 402, indicating the human is disposed in the free-space 412 which is adjacent to side of the at least the portion of the baggage conveyor 102 in the second set of frames. Thus, the processors 204 are configured to detect at least one of the body part of the human or the tool is disposed in the free space 412 in the set of frames by the bounding box (e.g., bounding box 312) being disposed adjacent to the bounding box 402 in the set of frames.

In embodiments, the processors 204 may detect if a baggage is left unattended in the free-space 412 adjacent to the baggage conveyor 102. The program instructions may cause the processors 204 classify the video 113 to determine the bounding box 404 including the baggage 108. The processors 204 may also detect the bounding box 404 is disposed adjacent to the bounding box 402 indicating the baggage 108 is disposed in the free-space 412 adjacent to the baggage conveyor 102. Thus, the processors 204 may detect the baggage is disposed in the free-space by the bounding box being disposed adjacent to the bounding box 402. The processors 204 may also cause the display 116 to raise an alarm in response to detecting that the bounding box 404 is disposed adjacent to the bounding box 402. In embodiments, the processors 204 may also cause the display 116 to raise an alarm in response to detecting that the bounding box 404 is disposed adjacent to the bounding box 402 for a duration, such as, but not limited to, for at least two minutes. If the baggage is left abandoned in the free-space 412 adjacent to the baggage conveyor 102 for more than the duration (e.g., 2 minutes), a notification is sent to the display 116 stating an abandoned baggage is present near the belt along with the region\zone of the baggage conveyor 102. Also, a screenshot file may be saved to the memory 202 capturing the incident.

The processors 204 may detect if the baggage 108 is moved from the conveyor by the tool 318 through the use of bounding boxes (not depicted) including the tool 318 in a similar manner as overlap of the bounding boxes 404 and at least one of the bounding box 406 or the bounding box 410. In this regard, the bounding box including the tool 318 may at least partially overlap the bounding box 404, indicating the tool is touching the baggage 108. The processors 204 may then detect movement of baggage 108 from the conveyor when the tool is used, instead of or in combination with the body part of the human.

In embodiments, the processors 204 may detect if the baggage 108 is pushed or pulled based on the direction of the human and the direction of movement of the baggage 108. The direction of the human may be detected based on a pose of the human. The pose may include, but is not limited to, sitting, standing, walking, touching bag, and the like.

Figure 5A:
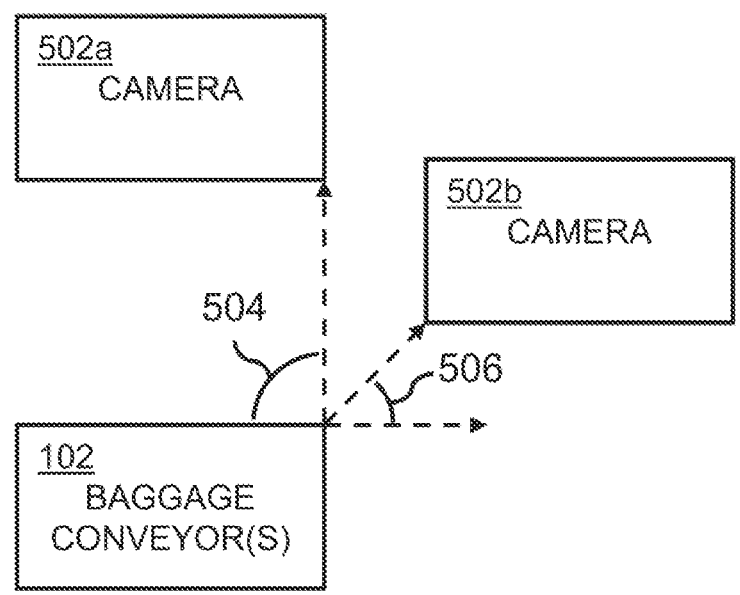
FIG. 5A depicts a block diagram of a baggage handling system, in accordance with one or more embodiments of the present disclosure.
Figure 5B:
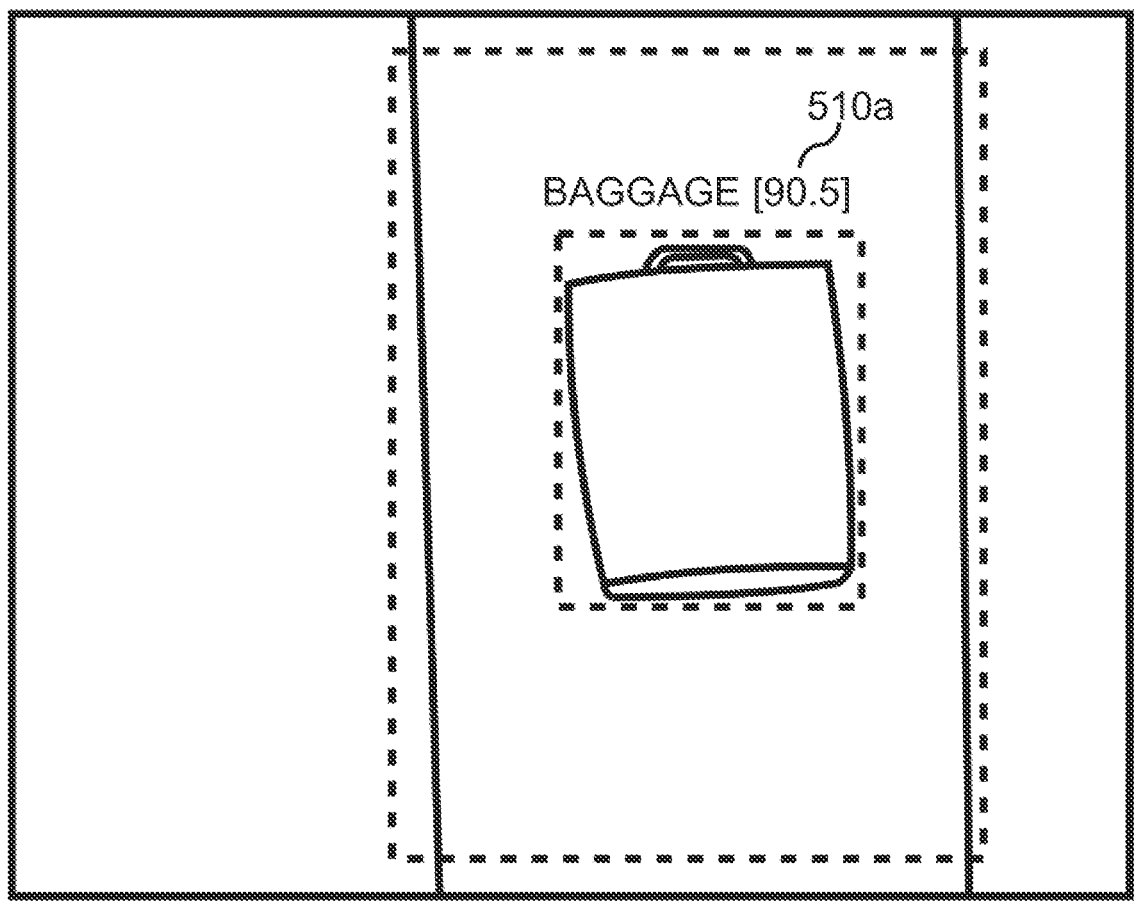
FIGS. 5B-5C depicts an image from a camera of a baggage handling system including bounding boxes, in accordance with one or more embodiments of the present disclosure.
Figure 5C:
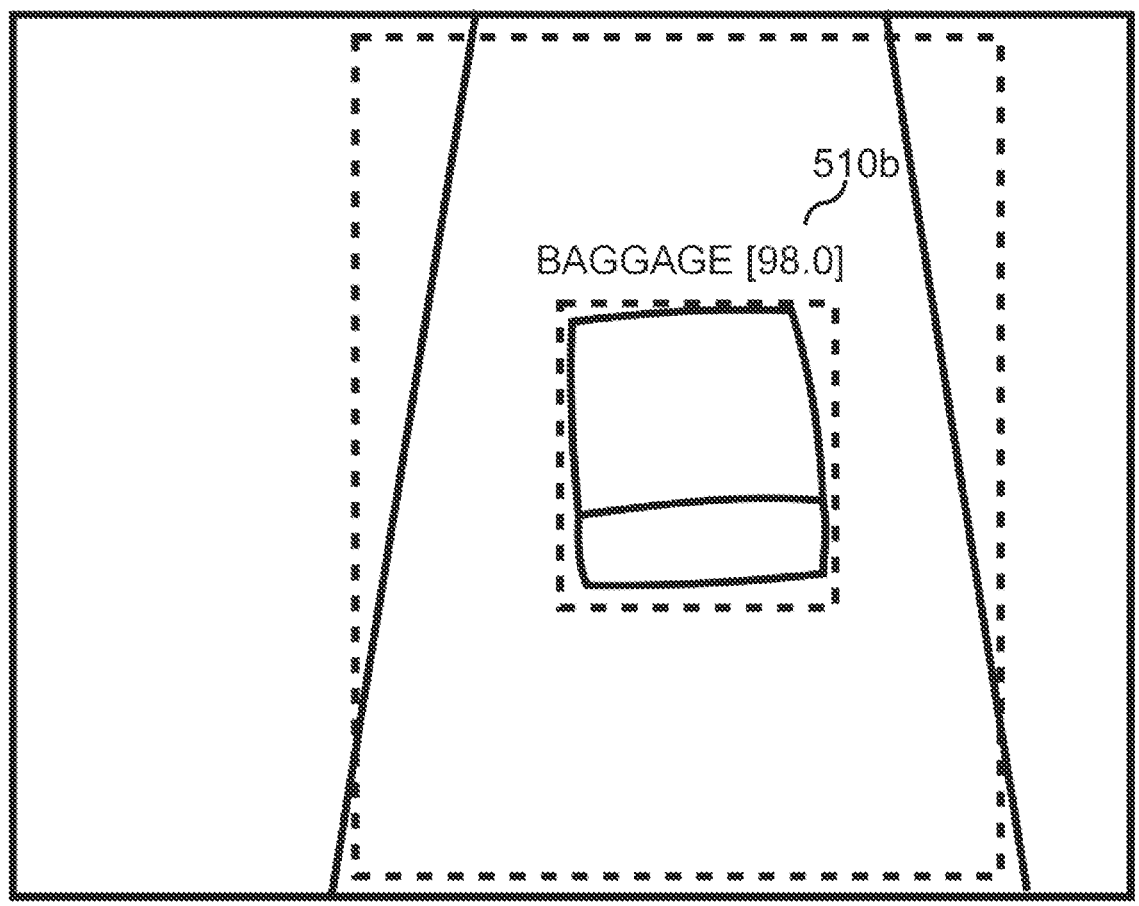

Referring now to FIGS. 5A-5C, an embodiment of the system 100 is described, in accordance with one or more embodiments. In embodiments, the baggage handling system 100 may include one or more of the cameras 112. For example, the baggage handling system 100 may include a first camera 502a and a second camera 502b (e.g., cameras 112). Each of the cameras 502 may capture a video (e.g., video 113) of at least a portion of the baggage conveyor 102. In some instances, the cameras 502 may capture the same portion of the baggage conveyor 102. The camera 502a and the camera 502b may be disposed above the baggage conveyor 102. The camera 502a and the camera 502b may be set an angle relative to the baggage conveyor 102. In embodiments, the camera 502a is parallel 504 to the first baggage conveyor 102. In this regard, the camera 502a may be referred to as a 90-degree top-down camera. In embodiments, the camera 502b is angled at an acute angle 506 relative to the baggage conveyor 102. The acute angle may include an angle between 30 and 60 degrees (e.g., 45 degrees). In this regard, the camera 502b may be referred to as a tilted camera. The system 100 may use both the top-down camera and tilted camera to capture the images 508 of video (e.g., video 113) from the cameras 502 for identification of the baggage 108. For example, the camera 502a may capture image 508a and the camera 502b may capture image 508b.

In embodiments, video from multiple of the cameras 502 may be classified. Based on experimental results, the detection of the baggage 108 on the baggage conveyor 102 captured in the images video at a 45-degree angle has a higher confidence score (e.g., confidence score 322) than in the video at a 90-degree angle. In embodiments, the confidence score from video from multiple of the cameras 502 may combined to arrive at decisions with higher accuracy by means of elimination, averaging or scaling. In embodiments, at least two of the cameras may be used to improve the accuracy of the bounding boxes 320. For the example depicted, the image 508a from video of the camera 502a includes a confidence score 510a of 90.5 for the bounding box including the baggage 108; and the image 508b from video of the camera 502b includes a confidence score 510b of 98.0 for the bounding box including the baggage 108. The processors 204 may then generate a combined confidence score by averaging the confidence score 510a and the confidence score 510b to result in a confidence of 94.25 of the baggage 108 being detected.

The number of the cameras, the positioning of the cameras, and/or the angles of the cameras 112 may be decided based on the structural condition of the region of interest at the airport 101. The number, positioning, and angle may be based on analysis performed using one or more methods which help in improving the accuracy with which the baggage 108 and the incidents can be identified.

Figure 6:
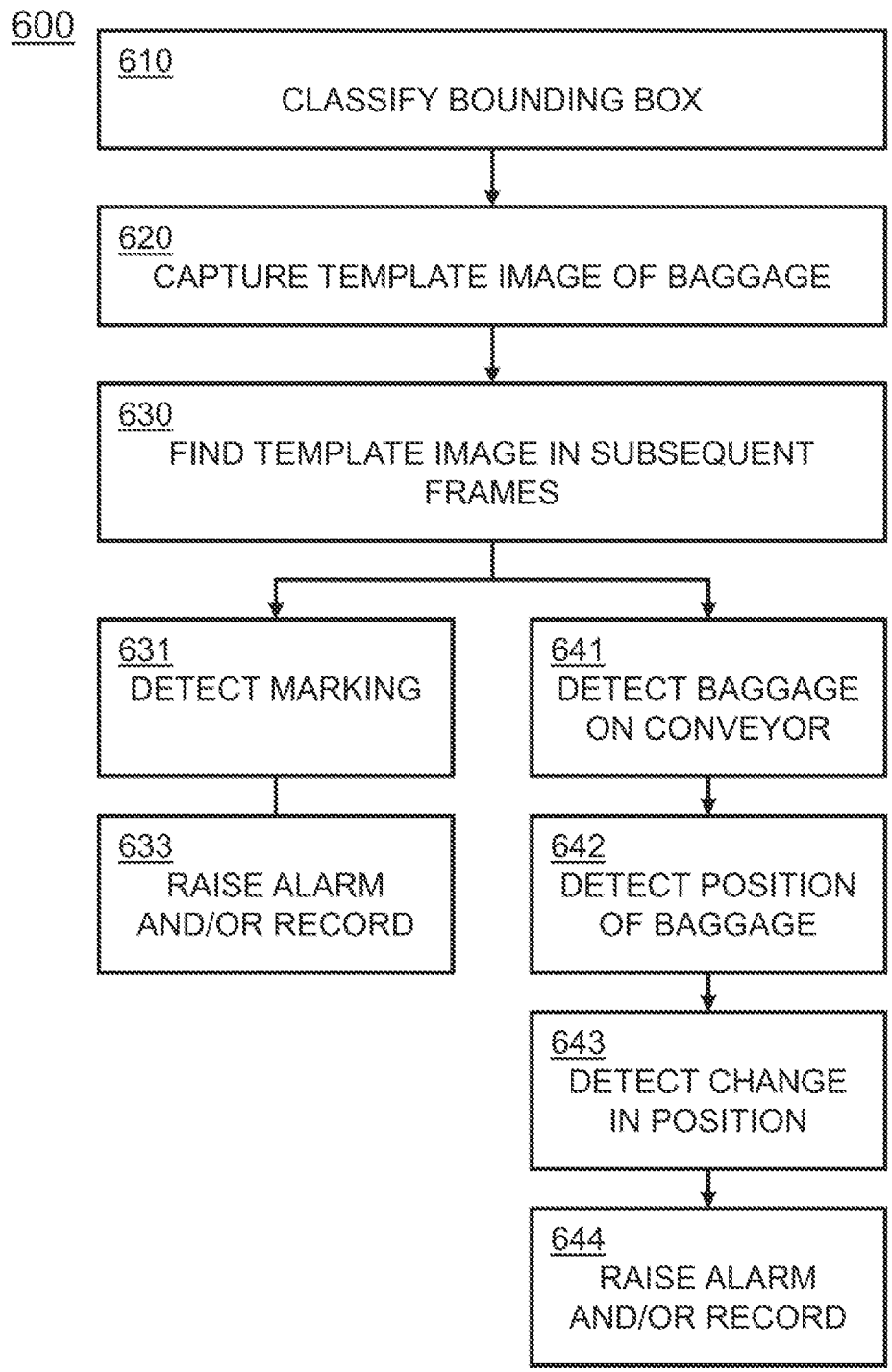
FIGS. 6-7 depicts a flow diagram of a method, in accordance with one or more embodiments of the present disclosure.

Referring now to FIG. 6, a flow diagram of a method 600 is described, in accordance with one or more embodiments of the present disclosure. The method 600 may be implemented by the processors 204 by executing one or more program instructions.

In a step 610, the processors 204 classify in one or more images of the video, a bounding box including a baggage. The bounding box may be classified by the object classification model.

In a step 620, the processors 204 may capture a template image of the baggage 108 from a frame of the video 113. The template image may be captured for use in combination with the template matching model 304. The location of the baggage may be from a bounding box detected by the object classification model 302.

In a step 630, the processors 204 may find the template image in one or more subsequent frames of the video 113. The processors may find the template image in one or more subsequent frames of the video 113 by the template matching model 304.

In a step 631, the processors may detect a marking in the one or more subsequent frames of the video. The marking is not present in the template image indicating the marking has been added to the first baggage after the camera captured the template image. The marking may include any marking used by thieves to mark a bag to be stolen. Advantageously, the marking may be detected without the template matching model needing to be pretrained with a database of markings. Rather the template matching model may detect a change in the baggage indicating the marking is added. In a step 633, the processors may raise and alarm and/or cause the memory to record the video with the marking.

In a step 641, the processors may detect a first baggage is disposed on the baggage conveyor and a second baggage is disposed on the baggage conveyor. A template image may have been captured for each of the baggage in the previous steps. The processor may detect a bounding box of the baggage overlaps a bounding box of the conveyor. In a step 642, the processors may detect the first baggage is disposed in front of the second baggage. The processors may detect the first baggage is disposed in front of the second baggage by the bounding box of the first baggage being disposed in front of the bounding box of the second baggage in the video indicating the first baggage is disposed in front of the second baggage on the baggage conveyor. In a step 643, the processors may detect the first baggage is now disposed behind the second baggage on the baggage conveyor. The processors may detect the first baggage is disposed behind the second baggage on the baggage conveyor by the bounding box of the first baggage being disposed behind the bounding box of the second baggage in subsequent frames of the video. The change in the position of the first baggage to be behind the second baggage may indicate the first baggage was removed, tampered with, and then put back onto the baggage conveyor. In a step 644, the processors may cause the display 116 to raise an alarm in response to detecting that the bounding box of the first baggage is disposed behind the bounding box of the second baggage on the baggage conveyor. In this regard, the method 600 may be advantageous for detecting and distinguishing between one or more baggage. The method 600 may be applied to distinguish between at least a first and a second baggage.

Figure 7:
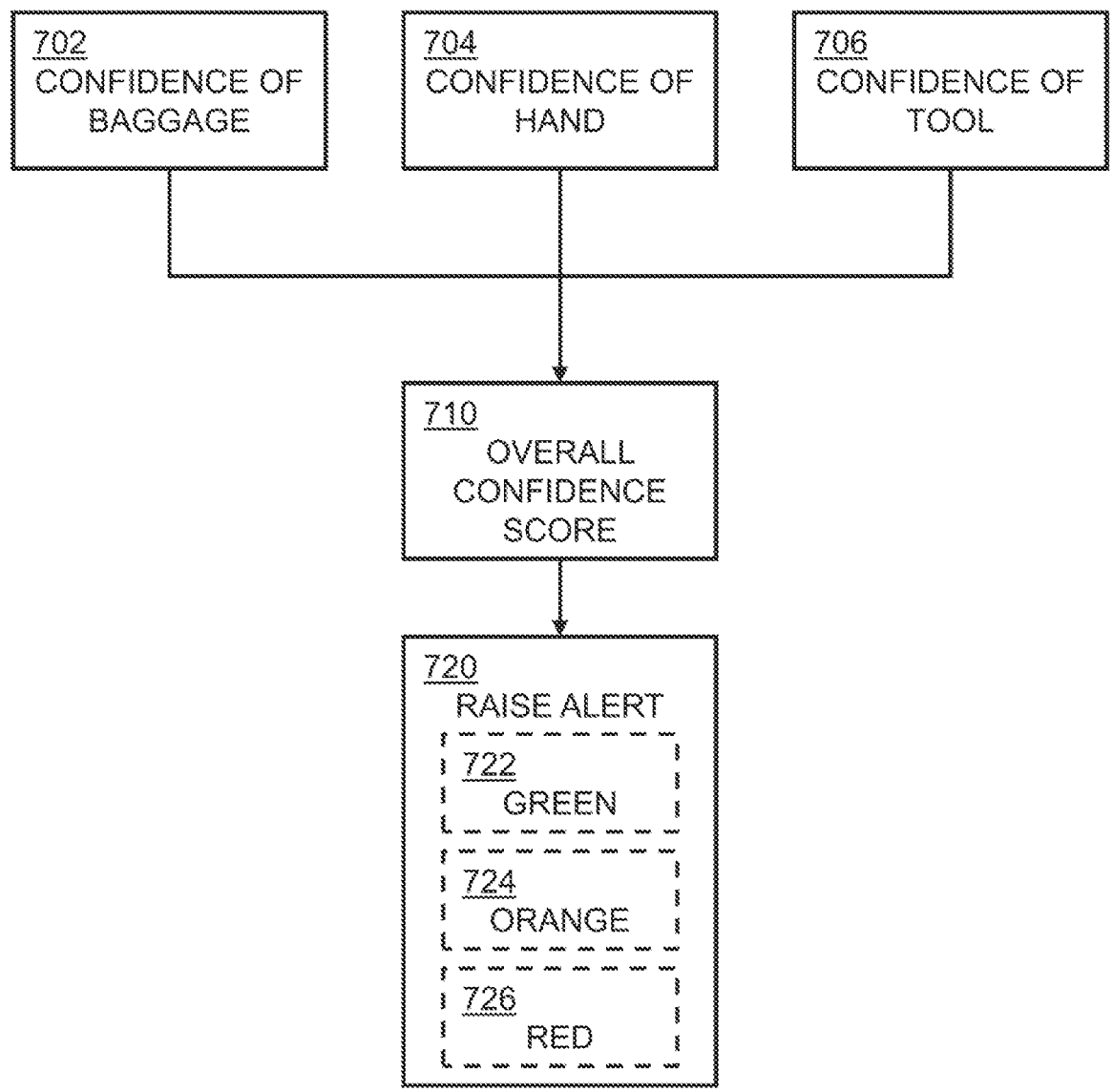

Referring now to FIG. 7, a flow diagram of a method 700 is described, in accordance with one or more embodiments of the present disclosure. The method 700 may be implemented by the processors 204 by executing one or more program instructions. The method 700 may be referred to as a flowchart for determining confidence map to raise an alarm. In order to quantitatively determine the approach of raising the alarm, the system 100 measures confidence scores 322 of detection of individual objects, cumulatively combines the confidence score to find out the overall confidence score of a particular scenario, and then raises an alarm based on the overall confidence score.

In a step, a confidence score 702, a confidence score 704, and a confidence score 706 are determined. The confidence scores may be determined by the object classification model 302. The confidence score 702 may indicate the quantitative detection confidence of the baggage 108. The confidence score 704 may indicate the quantitative detection confidence of the body part of the human (e.g., the confidence of the hand, the head, the leg, etc.). The confidence score 706 may indicate the quantitative detection confidence of the tool 318.

In a step 710, an overall confidence score is determined. The overall confidence score may be a statistical functional of the confidence score 702, the confidence score 704, and the confidence score 704. For example, the statistical functional may include any suitable statistical function, such as, but not limited to, a mean (e.g., arithmetic, geometric), a median, a mode, and the like.

In step 720, an alert may be raised. The alert may also be referred to as an alarm. The alert may be raised by the display 116 and/or the alarm system. An alert is described, in accordance with one or more embodiments of the present disclosure. In embodiments, the display 116 may raise an alert in response to detecting one or more conditions. Security personnel may view the display 116 to see the alert 700. The alert may include one or more levels. The levels may be used to differentiate between different risks of baggage theft. The system 100 may categorizes any incident into 3 types, green 722, orange 724, and red 726. When a tool, human head, human hand, human leg is detected, the system gives an orange 724 color signal on the monitor alerting the security to look into the monitor\display system to check if an event is going to happen. If a tool and/or a body part of the human (e.g., human head, human hand, human leg, etc.) is touching any baggage, then a red 726 color is flashed on the monitor screen and the incident is recorded. The detected tools and body parts are highlighted using a bounding box to alert the security and to provide easy visibility of it on the monitor\display system. For example, if the overall confidence score is below 75% then a green alarm is raised, If the overall confidence score is in between 75% to 85% then an orange alarm is raised. If the overall confidence score is above 85% then a red alarm is raised. The confidence score for triggering the alarm is not intended to be limited to the percentages described. The confidence score may be configurable based on the requirements of the airport 101. The confidence score for triggering the alarm may be configured by receiving an input from the user interface 208 or a similar interface.

Figure 8:
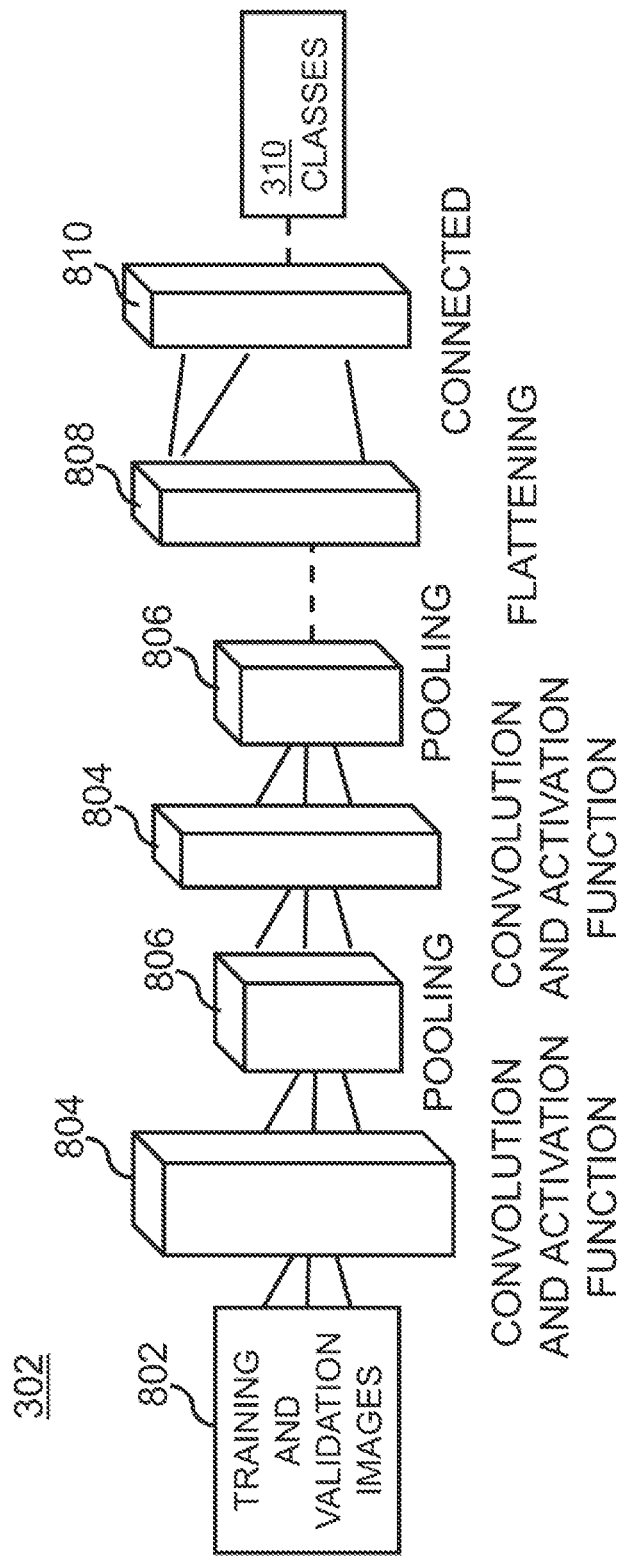
FIG. 8 depicts an object classification model, in accordance with one or more embodiments of the present disclosure.

Referring now to FIG. 8, the object classification model 302 is described, in accordance with one or more embodiments of the present disclosure. In embodiments, the object classification model 302 is a pre-trained model. In embodiments, the object classification model 302 is a neural network. The neural network used is pre-trained with baggage, human body parts, and/or tool image datasets. The image datasets may include airport and non-airport scenarios of the baggage, human body parts, and/or tools. The image datasets may also include low light inputs of the baggage, human body parts, and/or tools. The low light inputs may enable the object classification model 302 to detect the baggage, human body parts, and/or tools during a live run in the low light conditions.

The object classification model 302 may be trained and validated using one or more images. The object classification model 302 may be trained using a set of labelled data.

The below inputs are considered for creating the dataset: real images and videos, 3D simulated image videos, and the like. The real images and real video may be captured from airport and non-airport environments. The real videos may be captured and broken down to images at 10 Frames per second (frames per second is configurable in the non-volatile memory of the system based on airport environmental need). The 3D simulated images and videos are created with unique luggage and human objects and broken down to images at 10 Frames per second. These 3D videos represent airport as well as non-airport scenarios. Airport scenarios include a scenario similar to an airport conveyor belt region. Nonairport scenario can be any scenario which has the objects we are detecting. The images may then be manually labelled to indicate the classes 310 in the training images.

During the training phase, the object classification model 302 may able to adapt\identify new objects for detection of a wider dataset. In embodiments, the object classification model 302 may include an artificial neural network based deep neural network that's trained to detect any object appearing in front of camera. A deep learning architecture is chosen, and a model is generated which takes the digital data coming from the cameras and processes the video using principals of fitting in spatial and temporal dependencies to perform classification of objects (e.g., conveyor 102, baggage 108, body parts of humans (e.g., hand 312, head 314, leg 316, etc.), tool 318, etc.). The model may then detect events like theft, tampering, damaging, marking, and the like. The neural network-based algorithm for training of the module for object classification and event detection is shown.

The object classification model 302 may receive the training and validation images 802. The object classification model 302 may include one or more layers of convolution and activation functions 804. The convolution and activation functions 804 may extract feature vectors with weights contained in convolutional layers from the training and validation images 802. The activation functions may be used to achieve a desired accuracy. The activation functions may include any type of activation function, such as, but not limited to, a rectified linear activation unit (RELU) and the like. The object classification model 302 may also include one or more layers of pooling 806 following the convolution and activation functions 804. The pooling 806 may merge the feature vectors to a pooling layer for reducing the size or dimensionality of the feature vectors. The object classification model 302 may also include a layer of flattening 808. The flattening 808 may flatten the pooled layer into a one-dimensional data structure (e.g., a 1D array, a vector, etc.). The object classification model 302 may also include a connected layer 810. The connected layer 810 may be the last layer or the output layer. The connected layer 810 may include connections to the flattened layer. The object classification model 302 may be considered a customized neural network for baggage damage identification, baggage movements, and/or human detection.

In embodiments, the neural network is trained using low light images. For example, the training and validation images 802 may include low light images. Training the neural network to classify the images using the low light images may enable the object classification model 302 to detect the classes 310 of the objects in low lighting conditions (e.g., 1 lux).

The pre-trained model can be retrained for better accuracy and for detecting new kinds of baggage or other classes of objects. In embodiments, the processors 204 are configured to receive an input from the user interface 208. The input may include labels for the various objects (e.g., conveyor 102, baggage 108, body parts of humans (e.g., hand 312, head 314, leg 316, etc.), tool 318, etc.) in the video. The program instructions may cause the processors 204 to retrain the object classification model 302 using the labels.

Figure 9:
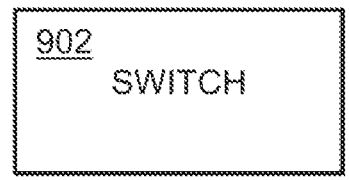
FIG. 9 depicts a camera of a baggage handling system, in accordance with one or more embodiments of the present disclosure.
Figure 9:
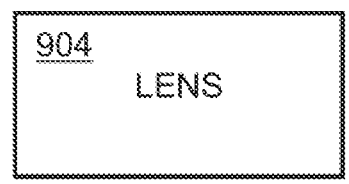
Figure 9:
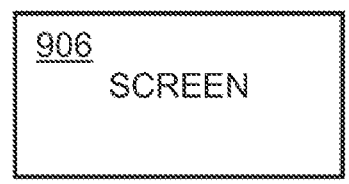

Referring now to FIG. 9, the camera 112 is described, in accordance with one or more embodiments of the present disclosure. In embodiments, the camera 112 may start to record the video 113 when the baggage conveyor 102 is turned on. The camera 112 may include one or more switches 902. The switches 902 may connect two points in a circuit when the baggage conveyor 102 is turn on. The switches 902 may then form an open circuit when the baggage conveyor is turned off. In this regard, there is no connection between the two legs of the switch when the switch 902 is open. When the belt is switched ON, the switch 902 makes a connection between its two legs and as a result the cameras are powered and switched ON. The power to the camera 112 may also be switched. The power may be switched when the baggage conveyor 102 is switched off and/or broken down with luggage on the belt. For example, the camera 112 may be switched on by the airport security (e.g., from the display 116).

In embodiments, the camera 112 may include a lens 904. In embodiments, the camera 112 may include one or more anti-glare screens 906. Glare on the lens 904 may be overcome by fitting the anti-glare screen 906 next to the lens 904. The video 113 may then have minimized glare due to the anti-glare screen even if light falls directly on the camera 112.

Referring generally again to FIGS. 1-9.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented. It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed:

1. A baggage handling system comprising:
   a first baggage conveyor;
   a first camera configured to capture a video, wherein at least a portion of the first baggage conveyor is disposed in the video;
   a display;
   a memory maintaining program instructions; and
   one or more processors configured to execute the program instructions causing the one or more processors to:
     receive the video;
     classify the video to determine:
       a first bounding box including the first baggage conveyor;
       a second bounding box including a first baggage;
       a third bounding box including at least one of a body part of a human or a tool;
     cause the display to display the video, the first bounding box, the second bounding box, and the third bounding box; and
     detect:
       the first baggage is disposed on the first baggage conveyor in a first set of frames of the video by the first bounding box overlapping the second bounding box in the first set of frames; and
       the at least one body part of the human or the tool touches the first baggage in the first set of frames by the third bounding box at least partially overlapping the second bounding box in the first set of frames.

2. The baggage handling system of claim 1, wherein the program instructions cause the one or more processors to record the video in the memory in response to detecting that the third bounding box at least partially overlaps the second bounding box.

3. The baggage handling system of claim 2, wherein the program instructions cause the one or more processors to record the video in the memory in response to detecting that the third bounding box at least partially overlaps the second bounding box for at least five seconds.

4. The baggage handling system of claim 1, wherein a free-space is disposed adjacent to a side of the at least the portion of the first baggage conveyor; wherein the free-space is disposed in the video.

5. The baggage handling system of claim 4, wherein the program instructions cause the one or more processors to detect:
   the first baggage is disposed in the free-space in a second set of frames of the video by the second bounding box being disposed adjacent to the first bounding box in the second set of frames; and
   at least one of the body part of the human or the tool is disposed in the free-space in the second set of frames by the third bounding box being disposed adjacent to the first bounding box in the second set of frames.

6. The baggage handling system of claim 4, wherein program instructions cause the one or more processors to:
   classify the video to determine a fourth bounding box including a second baggage;
   detect the second baggage is disposed in the free-space by the fourth bounding box being disposed adjacent to the first bounding box; and
   cause the display to raise an alarm in response to detecting that the fourth bounding box is disposed adjacent to the first bounding box.

7. The baggage handling system of claim 6, wherein the program instructions cause the one or more processors to cause the display to raise an alarm in response to detecting that the fourth bounding box is disposed adjacent to the first bounding box for at least two minutes.

8. The baggage handling system of claim 1, wherein the program instructions cause the one or more processors to preprocess the video to increase a luminance of the video.

9. The baggage handling system of claim 1, wherein the memory comprises an object classification model; wherein the one or more processors are configured to classify the video to determine the first bounding box, the second bounding box, and the third bounding box by the object classification model.

10. The baggage handling system of claim 9, wherein the object classification model comprises a pre-trained model.

11. The baggage handling system of claim 1, wherein the program instructions cause the one or more processors to:
    capture a first template image of the first baggage from a frame of the video; and
    find the first template image in a subsequent frame of the video.

12. The baggage handling system of claim 11, wherein the program instructions cause the one or more processors to detect a marking in the subsequent frame, wherein the marking is not present in the template image indicating the marking has been added to the first baggage after the camera captured the template image.

13. The baggage handling system of claim 11, wherein the program instructions cause the one or more processors to:
    classify, in one or more images of the video, a fourth bounding box including a second baggage;
    capture a second template image of the second baggage from the frame of the video; and
    find the second template image in the subsequent frame of the video.

14. The baggage handling system of claim 13, wherein the program instructions cause the one or more processors to:
    detect:
      the second baggage is disposed on the first baggage conveyor by the first bounding box overlapping the fourth bounding box;
      the first baggage is disposed in front of the second baggage on the first baggage conveyor by the second bounding box being disposed in front of the fourth bounding box in the video; and
      the first baggage is disposed behind the second baggage in a subsequent set of frames of the video by the second bounding box being disposed behind the fourth bounding box in the subsequent set of frames; and
    cause the display to raise an alarm in response to detecting that the second bounding box is disposed behind the fourth bounding box.

15. The baggage handling system of claim 1, wherein the first camera is disposed above the first baggage conveyor; wherein the first camera is parallel to the first baggage conveyor; the baggage handling system comprising a second camera configured to capture a second video; wherein at least the portion of the first baggage conveyor is disposed in the second video; wherein the second camera is disposed above the first baggage conveyor; wherein the second camera is angled at an acute angle relative to the first baggage conveyor.

16. The baggage handling system of claim 1, wherein the body part of the human comprises at least one of one of a hand, a leg, or a head.

17. The baggage handling system of claim 1, wherein the tool comprises at least one of a rope, a stick, or a thread.

\* \* \* \* \*